United States Patent [19]
Way et al.

[11] 3,848,853
[45] Nov. 19, 1974

[54] HIGHWAY SAFETY TIRE DEVICE

[76] Inventors: Merton B. Way, 5300 John R. Rd., Troy, Mich. 48084; John Pas, 2915 Hessel, Rochester, Mich. 48063

[22] Filed: Mar. 15, 1973

[21] Appl. No.: 341,788

[52] U.S. Cl............ 256/1, 404/6, 256/13.1, 114/219
[51] Int. Cl............................ E01f 13/00
[58] Field of Search ........... 404/6; 256/13.1, 1; 114/219, 220

[56] References Cited
UNITED STATES PATENTS

| | | | |
|---|---|---|---|
| 1,795,247 | 3/1931 | Burns | 256/13.1 |
| 2,413,210 | 12/1946 | Blackman | 114/219 |
| 2,562,957 | 8/1951 | Sipkin | 114/219 |
| 2,874,669 | 2/1959 | Norman | 114/219 |
| 3,602,109 | 8/1971 | Harrington | 404/6 |
| 3,661,359 | 5/1972 | Walker | 256/13.1 |

Primary Examiner—Nile C. Byers, Jr.

[57] ABSTRACT

An impact absorbing resilient exteriorly deformable device comprised of preferably used automobile tires, stacked together with their sidewalls engaging each other to generally form a hollow cylinder. The sides of said tire sidewalls being fixedly fastened together by elongated bolts, which extend through said sides. Said tires having spacers within the confines thereof associated with said bolts, to maintain the sidewalls at a fixed substantially open spaced distance from each other, a bottom is formed in said cylinder by a circular flat member supported by the lower rim of the lower tire in said stack. Said device is operable to be placed upon the roadway, at selected locations, to act as a safety device, warning or barricade to protect an automobile or its occupants from injury.

2 Claims, 4 Drawing Figures

PATENTED NOV 19 1974             3,848,853
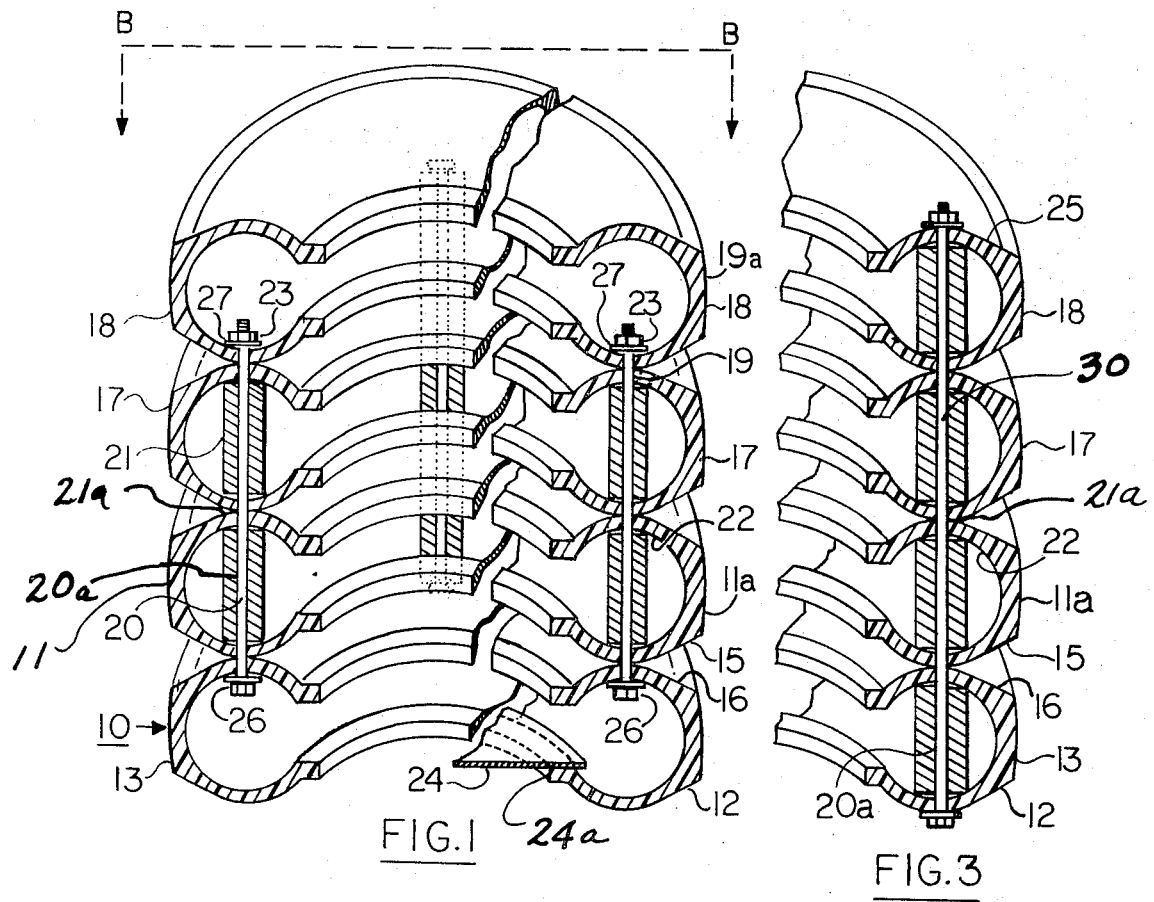
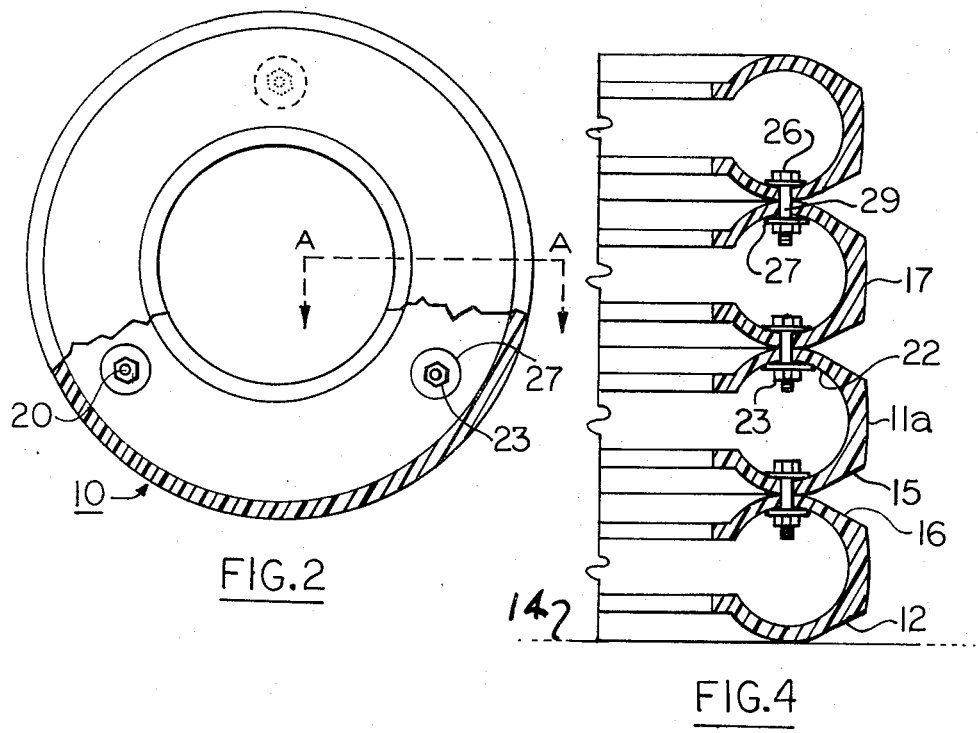

HIGHWAY SAFETY TIRE DEVICE

BACKGROUND OF THE INVENTION

1. Field of the Invention

This invention relates to portable safety devices and more particularly to portable kinetic energy absorbing safety barricades for reducing or preventing injury to persons and property upon collision of an automobile or other vehicle with such portable safety barricades.

2. Description of the Prior Art

Devices of this general character are known in the prior art for absorbing the kinetic energy of impact of colliding automobiles and vehicles and bumpers for boats are known, however, in the known devices the devices used for the vehicle protection have either been fixed to a stationery support or have been mounted integrally on the vehicle. There are no devices known to be used as barricades to take the place of the wooden frames and empty, 55 gallon metal barrels, commonly seen on the highways at present. Further, the devices shown in the prior art are heavy, cumbersome, expensive to manufacture, and subject to failure in operation. The prior devices are also dangerous and inconvenient to use and too bulky and heavy to transport to various locations for highway use as barricades, barriers or guards. The barrels used are usually of the 55 gallon type and are subject to being easily displaced and readily deformed on impact with a motor vehicle and also said barrels tend to cause considerable damage to any vehicles coming in contact with them. These objections also apply to the usual wooden or other type of fixed rigid barricades that are used upon the roadways and highways of this country.

SUMMARY OF THE INVENTION

Accordingly, the problems and difficulties encountered in the prior art are obviated by the present invention in which we provide a tough springy highway barrier or guard which is deformable upon impact without doing damage to either the barrier or vehicle which barrier is made of two or more discarded automobile, truck, or similar tires, stacked on top of each other and secured together by three or more long bolts or threaded rods with tubular spacer of wood, steel, or other available material, radially located in each tire to maintain rigidity of the unit when assembled. Such barrier body of our invention is compact and inexpensive to manufacture, efficient in operation, and convenient and safe to transport to a highway location for use as a vehicle barrier or guard.

An object of our invention is stated in the above abstract of disclosure.

It is another object of this our invention to provide a safety device for road or highway use which is constructed of used or discarded automobile, truck, or other vehicle tires stacked one on top of the other and fixedly secured to each other to form a rigid, cylinderical column when assembled.

It is the further object of our invention to provide a highway vehicle barrier or guard made up of two or more discarded automobile, truck, or other tires, stacked one on top of each other, and fixedly secured to each other by three or more long bolts with tubular spacer means of wood, steel, or other available material placed in a tire, engaging the sidewalls thereof, and held by said bolts to maintain the longitudinal spacing of the tire when it is assembled into a circular column.

It is a further object of this our invention to provide a guard or barrier of two or more discarded automobile, truck, or other tires, stacked one on top of the other and fixedly secured to each other having spacer means of wood, steel, or other available material in a tire or tires to maintain the longitudinal endwise spacing of the tires against compression forces and increase the rigidity thereof when it is assembled, which spacing means is contained within the tire column and is unexposed from the outside of the tires.

It is a further object of this our invention to provide a highway barrier or guard comprised of three or more discarded automobile, tires, stacked one on top of each other and fixedly secured to each other at the sidewalls thereon to form a cylinderical, hollow column body and a bottom panel means closing off or sealing the bottom of said column so that said column may be filled with sand or other material to weight the guard, and to provide sand for use on the highway when slippery conditions exist thereon, as well as to provide a safety barrier.

It is further an object of this our invention to provide a highway vehicle guard or barrier made of discarded automobile truck, or other tires, stacked one on top of the other, and fixedly secured together by fastening means into a hollow, cylinderical column body, the outside of said tires being individually and alternately painted a bright color such as yellow or white, to provide a warning signel to drivers that a hazardous condition exists on the highway.

Other and further objects of this our invention will become apparent from the following description of the drawing, the description of the preferred embodiment and the appended claims.

BRIEF DESCRIPTION OF DRAWING

The present invention may be better understood and numerous other features and advantages thereof will become apparent to those skilled in the art by references to the accompanying drawing, wherein like reference numerals refer to like elements in the various figures in which:

FIG. 1 is a perspective view of our novel highway tire barrier or guard, showing two arrangements for fastening the tires together into a guard and with the bottom closure member shown incorporated therein.

FIG. 2 is a sectional planned view taken along lines B—B of FIG. 1 showing the arrangement of fastening members.

FIG. 3 is a partial sectional view taken along A—A of FIG. 2, showing a modification of the fastening means.

FIG. 4 is a sectional view taken along line A—A of FIG. 2, showing a alternative method of fastening the tires together.

DESCRIPTION OF THE PREFERRED EMBODIMENT

Referring now in detail to the drawing and to particularly FIG. 1. Our highway safety tire barrier or guard device is denoted generally by the numeral 10. It is shown as including four motor vehicle tires of the same size and shape, stacked one on top of the other so that the bottom sidewall 12, of the first tire 13 engages a surface such as the ground 14. A second tire 11, is stacked on top of said first tire so the bottom sidewall 15 of said second tire engages a top sidewall 16 of the first tire. The third tire 17, is placed upon said second tire in the same manner as said second tire is placed on said first tire and the fourth tire 18 is placed on said third tire 17, in the same manner as the third tire is placed on the second tire, so that their sidewalls tangentially engage each other, and the stacked tires are generally defined in the outline of a hollow cylindrical body 19a. Bores or openings 19 are drilled or punched annularly in the sidewalls of said tires at the point of tangency 21a and aligned with each other so that when said tires are stacked the said bores define at least two axial oppositely spaced openings through said sidewalls of said tires, except the outer 4 sidewalls 12 of the first or tire 13, and outer sidewall 25, of tire 18, which are not drilled or punched for reasons which will soon become apparent from the following description. Fastening means or at least two elongated bolts 20 are positioned in said bores with spacers 21, having bores 20a and placed inside the intermediate tires and held by said bolts through said bores 20a to engage inside sidewalls 22, thereof, to maintain the open spacing of the tires. A nut 23, is then screwed to the end of said rod, the head 32 and said nut thereof securely fastening the tires together by their sidewalls as an integral unit. The bottom wall 24 is placed on rim 24a in said bottom tire prior to the assembly of the tires to allow sand or other materials (not shown) to be contained in said barrier. Referring to FIG. 3, a modification is shown whereby the bolt 30 extends completely through all the tires including the outside walls 25, and the head 26, and nut 27, are exposed. The latter application is useful where additional rigidity is needed and there is no danger of damage to the vehicle or other objects from exposed bolt ends. FIG. 4 discloses a modified version of fastening of the tires together, said tires are stacked in the same manner as previously described for FIGS. 2 and 3, however, the touching sidewalls 28 are independently fastened together by a series of bolts 29 at each point of contact by the sidewalls, this allows the tire guard somewhat more flexibility. However, they are not compressed in any way except by the weight of the tires themselves.

Many modifications may be made by those who desire to practice the invention without departing from the scope thereof, which is defined by the following claims.

We claim:

1. In a highway safety device for use as a barrier on a roadway, the combination of, at least three full-scale used motor vehicle tires concentrically arranged and adapted and stacked to form an elongated, cylindrical, integral columnar body having an elongated, concentric, cylindrically outlined opening formed by the inside rims of said stacked tires, concentric outside completely cylindrical walls defined by the treads of said tires, and transverse completely circular sidewalls connected between said rims and said tread, said sidewalls having circular convex portions thereof each contacting the circular convex portion of the tire adjacent to it, walls defining bores formed annulary and axialy in the side walls of said tires generally at the point of tangency thereof, said bores aligned with each other so that when said tires are stacked said bores define at least two axial oppositely spaced openings through said side walls, and fastening means operable to fixedly fasten said tires integrally together in shock resistant relationship to each other through said connected sidewall circular portions only of said sidewalls for leaving said concentric opening entirely free of obstruction, said fastening means including a plurality of rigid elongated fastening members egaging said bores and elongated, one-piece spacers engaging the sidewalls of said tires adjacent said elongated members in opposed tensioned relationship to said elongated members to maintain said stacked tires in rigid spaced shock resistant relationship to each other.

2. In a highway saftey device, the combination of the plurality of conventional tires stacked one upon the other to form a generally cylindrical hollow body with the adjacent sidewalls thereof contacting each other, and fastening means including a plurality of bolts and nuts radially connecting the side-walls only of said tires together to form a generally rigid stacked unit, and a bottom closure member disposed to overlap the rim of the lower most tire to form a closed cylinder for holding materials.

* * * * *